UNITED STATES PATENT OFFICE.

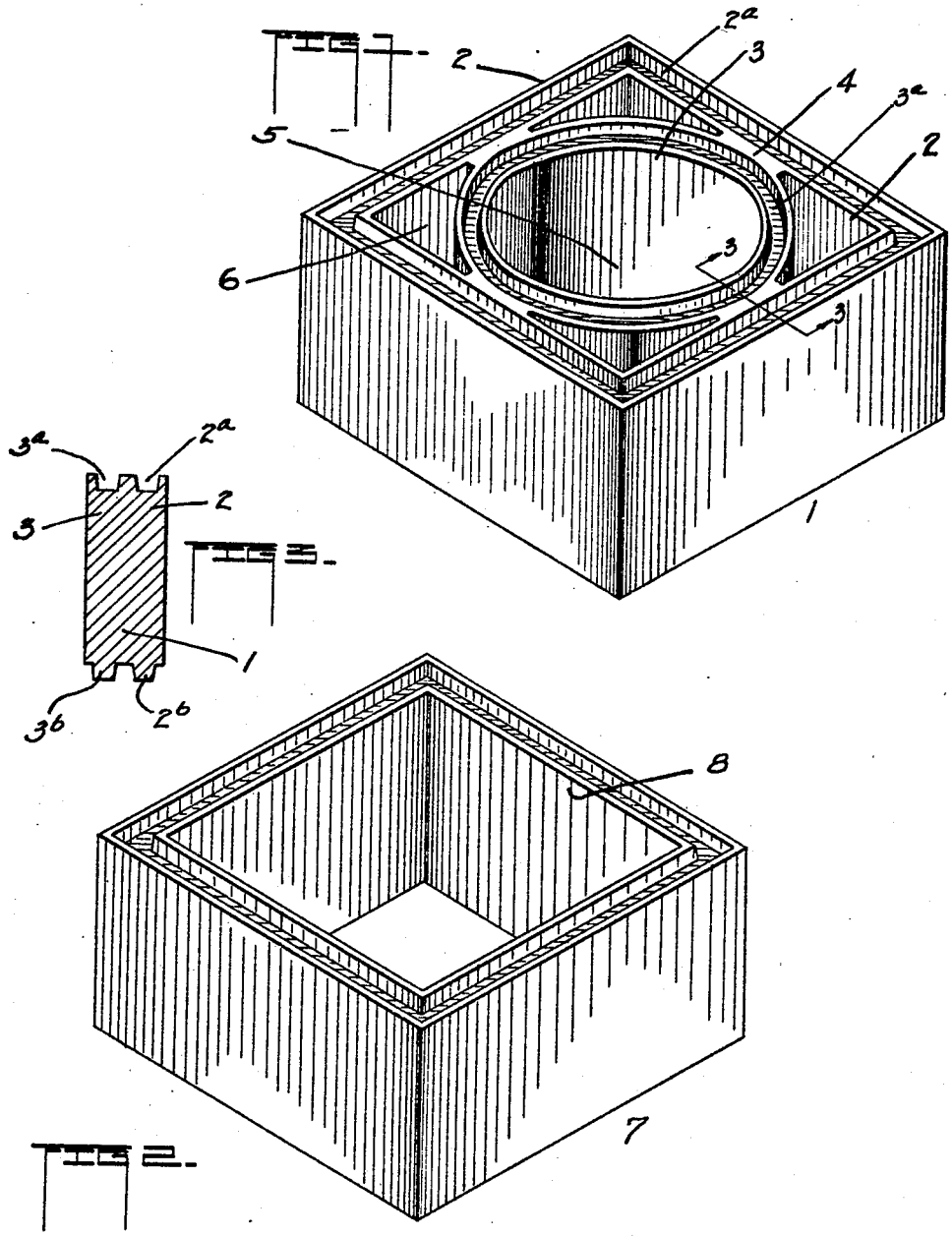

FRED PATEE, OF CASPER, WYOMING.

BUILDING BLOCK.

1,418,160.      Specification of Letters Patent.      Patented May 30, 1922.

Application filed June 21, 1920. Serial No. 390,331.

*To all whom it may concern:*

Be it known that I, FRED PATEE, a citizen of the United States, a resident of Casper, State of Wyoming, have invented new and useful Improvements in Building Blocks, of which the following is a specification.

This invention has reference to building blocks, and it has for its object to provide a block made from materials which will insure that chimneys made from the same for use in dwellings shall be absolutely fire and weather proof, and which will not expand or contract.

To the accomplishment of these ends, I make a building block, the component parts are asbestos aggregate, Portland cement and hydrated lime mixed with suitable proportions of water.

The mechanical means employed in mixing and forming the block, does not form any part of the present invention, therefore, will not be discussed; it being understood that suitable means may be employed.

The individual blocks when constructed, may preferably be of the forms shown in the accompanying drawings, wherein:

Figure 1 is a perspective view of a block having the center smoke opening and corner ventilating openings;

Figure 2 is a view similar to Figure 1, except that the block has one opening and is such a block as would be used as a lining for brick chimneys, and Figure 3 is a cross-section on the line 3—3 of Figure 1;

Like characters of reference denote corresponding parts throughout the figures.

This application is a companion application to that filed by me of even date herewith, in which claims are presented to the block structure per se.

The block is composed of asbestos aggregate 5 to 7 parts; Portland cement 1 part and hydrated lime 10 to 20 per cent of the weight of the cement. These materials are mixed with water, the amount of which depends on the amount of moisture in the asbestos.

When mixing the asbestos aggregate, cement and lime, it is preferable to mix these ingredients dry. If the materials are mixed in a mechanical mixer, they can of course be mixed gradually as they are put into the mixer and then add water until a proper mortar is obtained. This mortar is then taken from the mixer and tamped into form, and when such a form is filled, pressure should be applied. When the pressure is applied, the mixture should be just dry enough so that the block will show wet on the surface, but there should not be enough moisture in the block so that when under pressure, water will squeeze out of it.

Referring to the drawings disclosing blocks made in accordance with my invention, 1 designates the block formed of the rectangular outer wall 2 and the circular inner wall 3 joined to the outer wall at points 4 to produce an integral element. The wall 3 produces the central round, smooth smoke chamber 5, and 6 are corner ventilating openings formed by the circular wall 3 and the outer wall 2 and are useful as vents to carry off cold air from the floor of a room, or to carry off smoke, fumes and foul air from the top of the room just under a ceiling; it being understood, of course, when a plurality of blocks have been laid one upon the other to build up a chimney, openings would have to be made communicating with the central opening 5 and corner openings 6.

When forming the blocks 1 I prefer to provide one face with grooves $2^a$ and $3^a$ in one face of the walls 2 and 3 respectively, and with tongues $2^b$ and $3^b$ in the opposite face of the walls 2 and 3, respectively. These tongues and grooves, respectively, when the blocks are laid one upon the other, insure tight joints and a rigid construction.

In Figure 2 I have illustrated a block 7 in all respects similar to Figure 1, except that it comprises only the rectangular wall 8 formed with the one central smoke opening. This block is designed for the building of an asbestos flue lining for brick chimneys, so as to produce an absolutely fire proof chimney.

What I claim is:

1. A building block composed of asbestos aggregate between 5 and 7 parts; Portland cement 1 part; hydrated lime between 10 and 20 per cent of the weight of the cement, the same being mixed with a suitable quantity of water.

2. A building block composed of asbestos aggregate of not less than 5 nor more than 7 parts; Portland cement not to exceed 1 part; hydrated lime not less than 10 nor more than 20 per cent of the weight of the cement, the same being mixed with a suitable quantity of water.

In witness whereof, I have hereunto affixed my hand and seal this 12th day of May, 1920.

FRED PATEE.